(12) United States Patent
Ohbayashi et al.

(10) Patent No.: US 6,393,892 B1
(45) Date of Patent: May 28, 2002

(54) IMPACT SENSOR AND IMPACT-PRESSURE SENSOR

(75) Inventors: Yoshiaki Ohbayashi, Nara; Keiji Mine; Seisaku Hirai, both of Yao, all of (JP)

(73) Assignee: Hosiden Corporation, Osaka (JP)

( * ) Notice: Subject to any disclaimer, the term of this patent is extended or adjusted under 35 U.S.C. 154(b) by 0 days.

(21) Appl. No.: 09/604,652

(22) Filed: Jun. 27, 2000

(30) Foreign Application Priority Data

Nov. 9, 1999 (JP) .......................................... 11-318073

(51) Int. Cl.[7] .............................. G01N 3/30; G01N 3/32
(52) U.S. Cl. ..................................................... 73/12.01
(58) Field of Search .............................. 73/12.01, 28.03, 73/23.21, 492; 200/61.45; 439/604

(56) References Cited

FOREIGN PATENT DOCUMENTS

JP            2000193678      *    7/2000    ........... G01P/15/06

OTHER PUBLICATIONS

Everett et al; Generalized Recognition of single ended Contact Formations; IEEE; 1999 vol. 15; abstract.*
Skubic et al.; Identifying single ended contact formations From Force Sensors;; 2000; IEEE; 2000; vol. 16 p597–603.*

* cited by examiner

*Primary Examiner*—Benjamin R. Fuller
*Assistant Examiner*—Andre Allen
(74) *Attorney, Agent, or Firm*—Armstrong, Westerman & Hattori, LLP (57) ABSTRACT

To attain an impact sensor designed compact and to be readily assembled.

The impact sensor comprises main part 100 of sensor involving cavity 110, of which bottom surface serves as the fracture part 120; impact force transfer member 130 provided on said fracture part 120; weight 200 being confined in said cavity 110; and seal member 300 to close the cavity 110 with the weight 200 left confined therein, whereby the fracture part 120 is apt to be broken up by the weight 200, when an impact exceeding the predetermined value has been encountered.

6 Claims, 13 Drawing Sheets

IMPACT SENSOR AND IMPACT-PRESSURE SENSOR

FIELD OF THE INVENTION

The present invention relates to those impact sensor being incorporated, e.g. in cameras and other precision instruments or air bag in the automobile industry, which will induce current interrupting motion, whenever an impact force exceeding predetermined value would have been encountered as well as to those impact-pressure sensors which are designed to interrupt current, whenever an impact or a pressure exceeding predetermined value would have evolved at those electronic parts subject to an internal pressure, e.g. in lithium ion battery, capacitor, etc.

PRIOR ART

A plurality of rechargeable types of batteries such as lead accumulators, nickel-cadmium-batteries is incorporated in conventional electronic apparatuses, e.g. cellular phone, video-camera, etc. Those batteries are susceptible to such kind of trouble as over-charged—or short-circuited state caused by failure or mishandling of electronic apparatuses, in which case over heated batteries, gas generation from decomposed electrolytic solution, elevated pressure in the batteries resulting in an explosion would be often encountered. As the result those rechargeable types of batteries are normally equipped with different types of protective device.

Japanese Laid-open Utility Model No. 64-38764 discloses e.g. a protective device which provides a flat metal collecting lead extending from electrically negative or positive metallic collector up to output terminal with a circular or elliptic perforation, around which fluoric resin is then made deposited.

Such kind of protective device is featured with a narrow portion of collecting lead localized at said perforation which would become readily disrupted, whenever an elevated pressure will evolve inside the battery. In addition the protective device is kept free from any possible misoperation due to the fact the area around the perforation is covered by fluoric resin which is sufficient to make said area adequately corrosion proof.

Japanese Laid-open Patent No. 6-36752 discloses also a protective device which provides a seal piece atop the battery with a pressure relief bore and is equipped with a thin film having a diaphragm corresponding to said bore in an area outside the seal piece. The protective device insures a stabilized tripping pressure, since the diaphragm and thin film with an uniform thickness may be accepted by the device.

In the protective device disclosed under Japanese Laid-open Utility Model No. 64-38764, however, the fluoric resin covering the area liable to be ruptured around the perforation makes it more inconvenient to adjust the tripping pressure towards the predetermined value, and to provide perforation of predetermined size within the narrow width of lead where it is required under the recent trend to make rechargeable batteries more compact. In addition, it is rather difficult to make the protective device released in a safe manner as the current collecting lead is originally designed to be ruptured mechanically, in which case a larger tripping pressure should be maintained.

In case of the protective device disclosed under Japanese Laid-open Patent No. 6-36752 it is required to equip the bore in the seal piece with both a diaphragm and a thin film resulting in a complicated configuration. This will make it more difficult to prepare the protective device under the recent trend towards a miniaturized batteries. Further it appears that a misoperation of protective device is liable to be caused by possible interference from outside resulting in an eventual discharge of electrolytic solution upon tripping, since the diaphragm is designed to remain left under an exposed state.

Originally these protective device is based on a conception to react against an elevated pressure. They are, however, by no means designed to interrupt current in such a case where batteries are subjected to an impact, intensity of which exceeds a predetermined level. To cope with such case of impact interference conventional batteries have to be equipped with another type of sensor.

The present invention aiming to solve the aforementioned disadvantage of prior art offers impact- and impact-pressure sensors which may be readily assembled and made more compact so as to be integrated into rechargeable batteries.

OUTLINE OF THE INVENTION

The impact sensor under the present invention comprises: main part of sensor having a cavity, at least one side of which is made susceptible to fracture; impact force transfer member; weight being housed in the cavity; and seal member for the cavity having the weight confined therein. Upon occurrence of interference by an impact force exceeding predetermined level a fracture will occur at the defined area at the cavity through the acceleration force caused by the weight.

The impact-pressure sensor under the present invention comprises: main part of sensor having an isolated hollow, at least one side of which is made susceptible to fracture; member provided within the fracture part designed to transfer force; seal member which is secured to the main part of sensor and is located at the predetermined position spaced apart from the fracture part; and weight being housed in the hollow. Within said seal member is provided a passage that links up said hollow with outside environment. Should an impact exceeding the predetermined level have been encountered the fracture part is apt to be broken up by the weight. Should the difference between pressure inside the cavity and the atmospheric pressure have exceeded the predetermined value fracture will also result.

BRIEF DESCRIPTION OF THE DRAWINGS

Of a series of drawings attached hereto is:

FIG. 1 drawing of an impact sensor under the first embodiment of the invention, which comprises:

(A) schematic sectional view (B) schematic bottom plan view

FIG. 2 drawing of another impact sensor under the first embodiment of the invention, which comprises:

(A) schematic sectional view (B) schematic bottom plan view

FIG. 3 drawing of still other impact sensor under the first embodiment of this invention, which comprises:

(A) schematic sectional view (B) schematic perspective view

(A) schematic sectional view (B) schematic bottom plan view (C) schematic drawing in detail of integral part FIG. 7 schematic drawing in detail of integral part of another impact sensor under the second embodiment of this invention FIG. 8 drawing of an impact sensor under the third embodiment of this invention, which comprises:

(A) schematic sectional view (B) schematic bottom plan view (C) schematic drawing in detail of integral part FIG. 9 drawing in detail of integral part of another impact sensor under the third embodiment of this invention FIG. 10 drawing of an impact-pressure sensor under the fourth embodiment of this invention, which comprises:

(A) schematic sectional view (B) schematic side view

(A) schematic sectional view (B) schematic plan view

DESCRIPTION OF REFERENCE NUMBERS

| A, B, C | Impact sensor |
| --- | --- |
| 100 | Main part of sensor |
| 110 | Cavity |
| 120 | Fracture part |
| 130 | Impact force transfer member |
| 200 | Weight |

DESCRIPTION OF THE PREFERRED EMBODIMENTS

Figure 1:
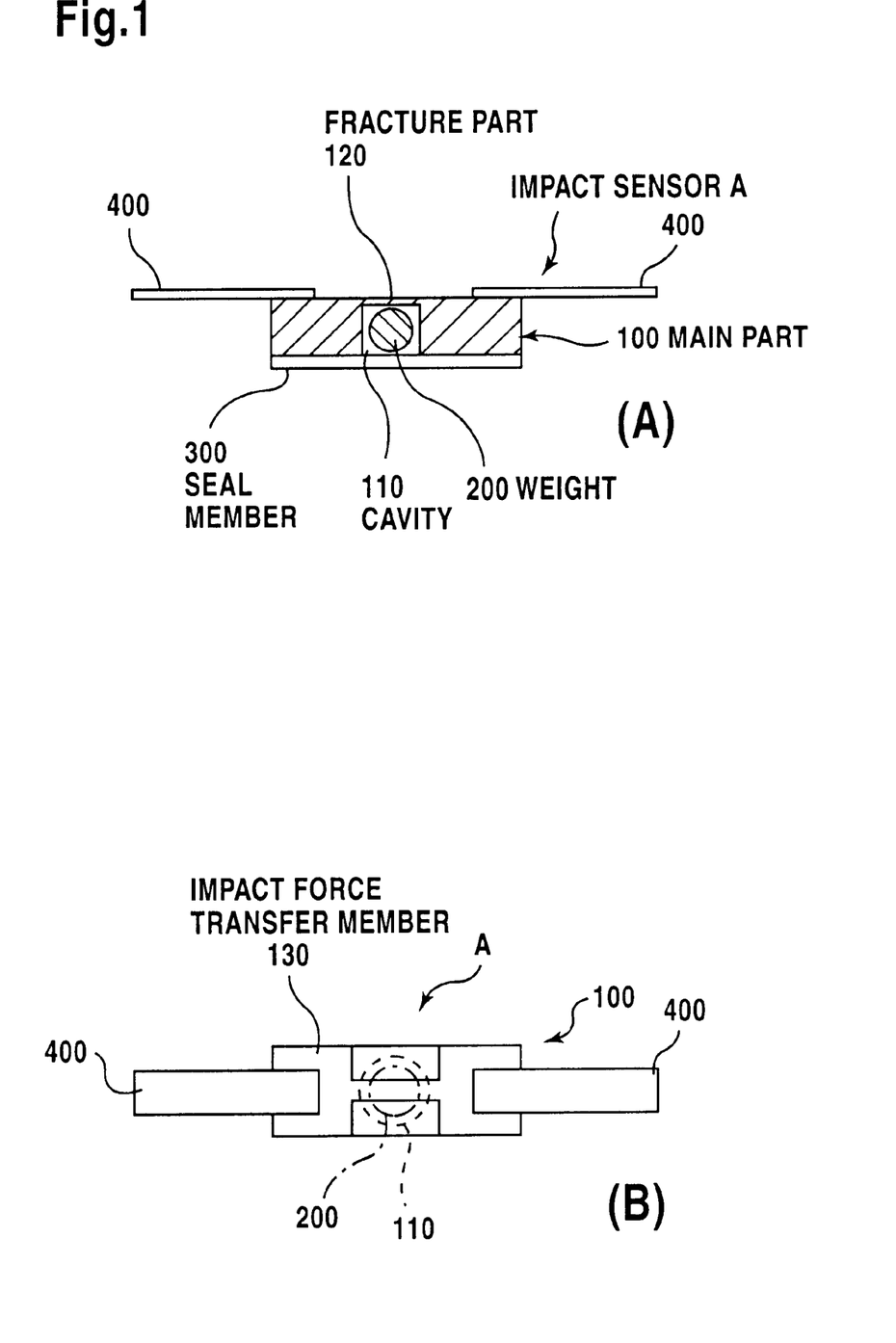
Figure 2:
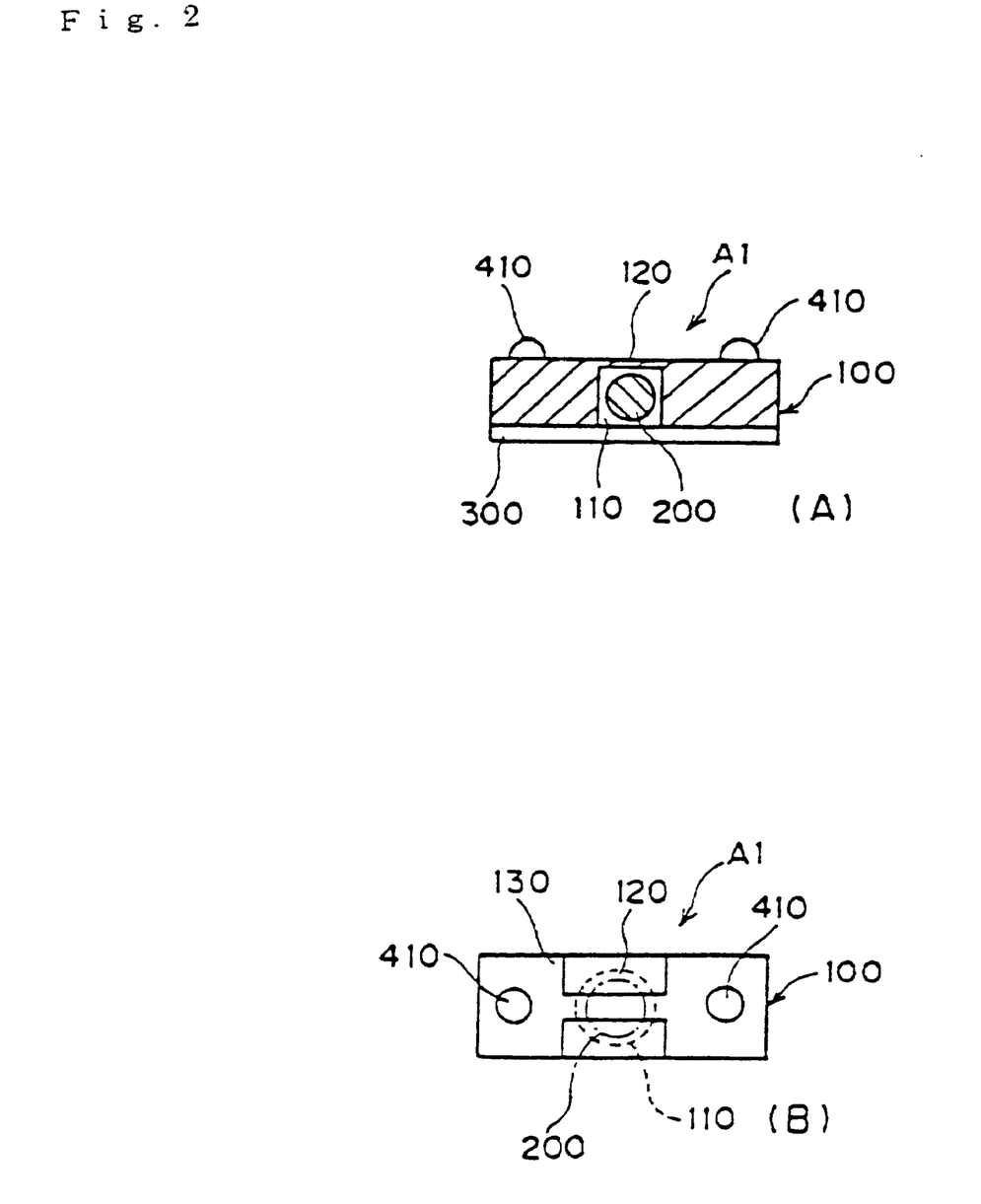
Figure 3:
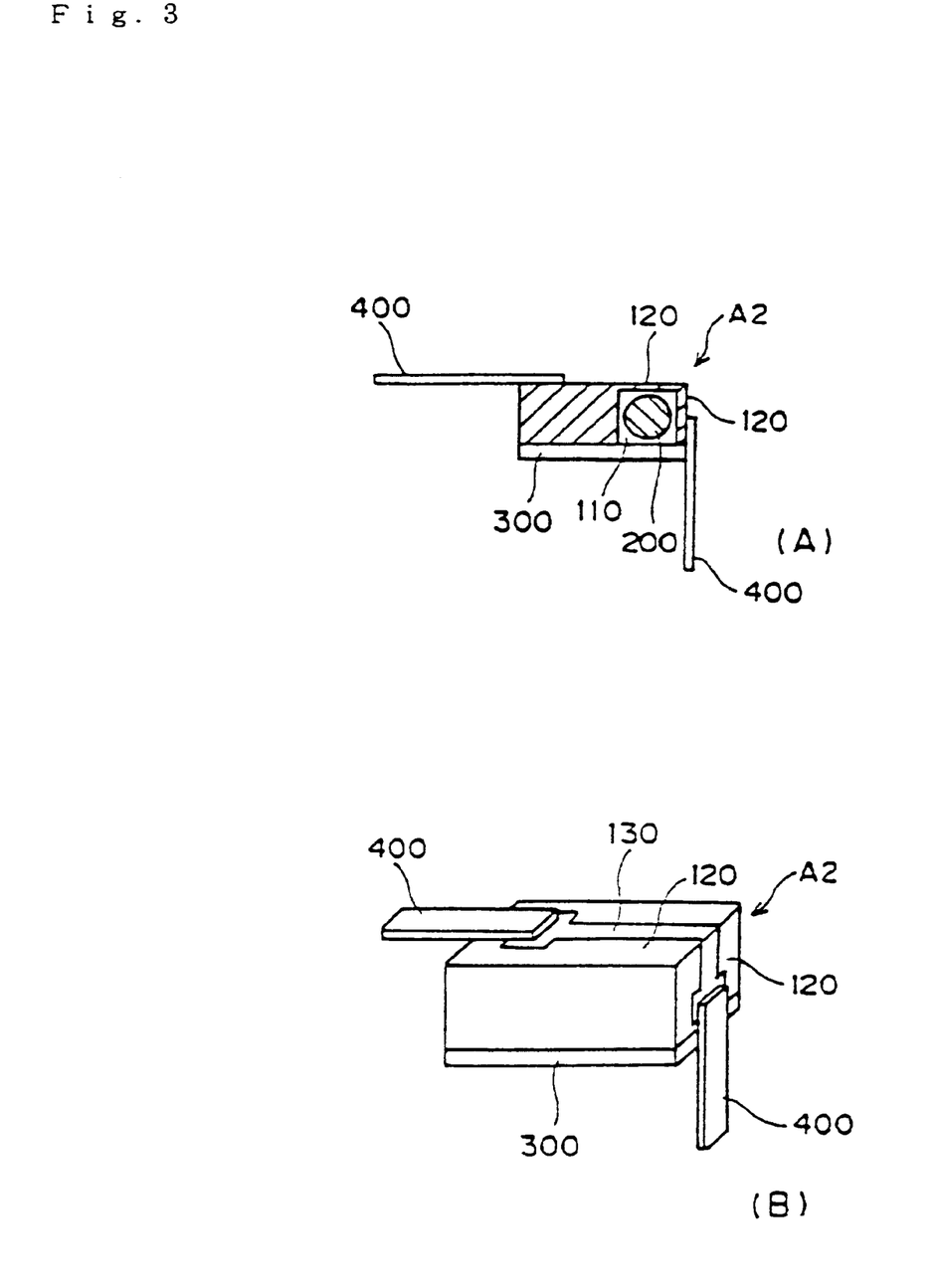
Figure 4:
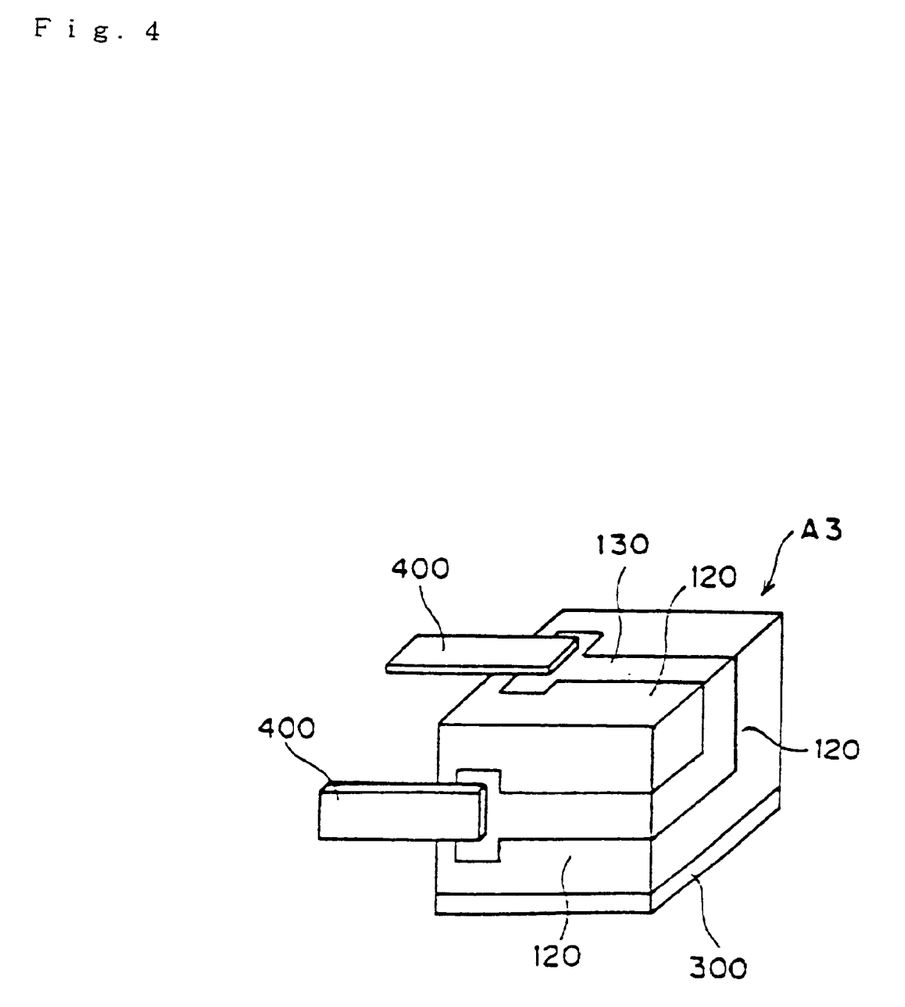
FIG. 4 schematic perspective view of still other impact sensor under the first embodiment of this invention FIG. 5 schematic sectional drawing showing tripping mechanism of impact sensor under the first embodiment of this invention FIG. 6 drawing of an impact sensor under the second embodiment of this invention, which comprises.
Figure 5:
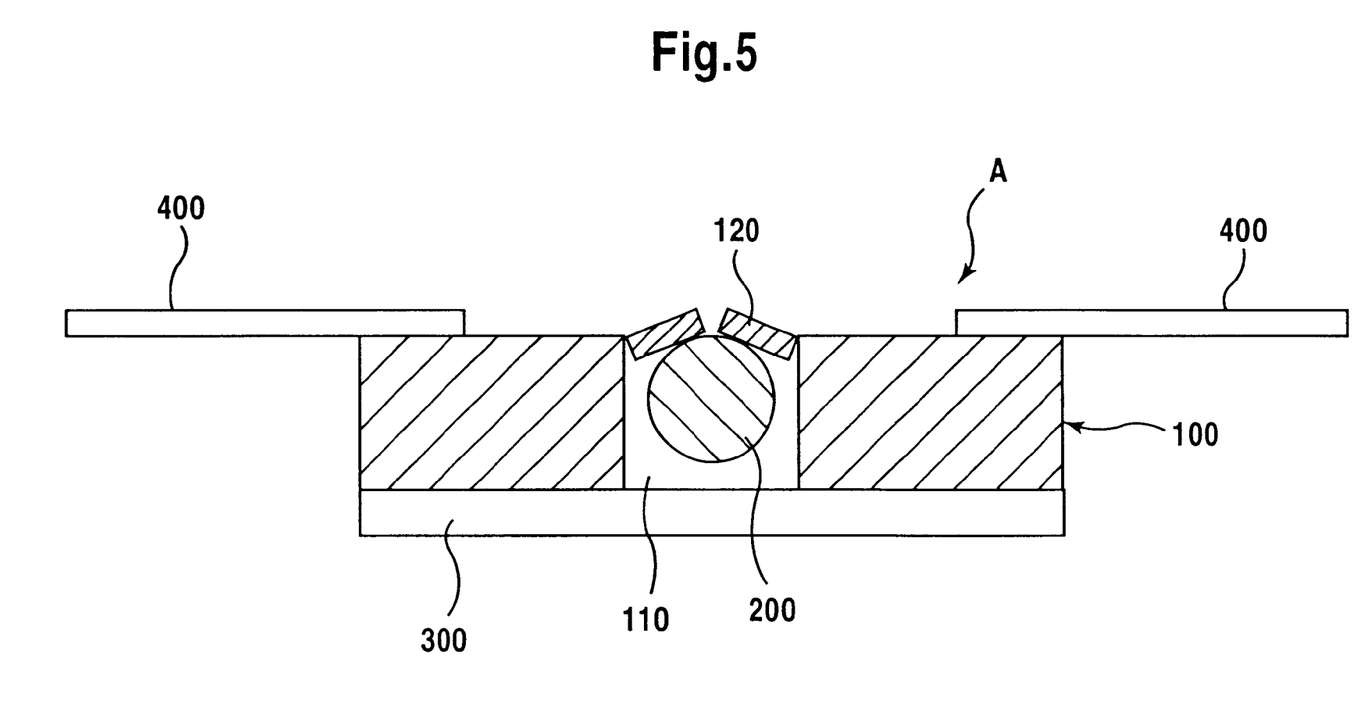

FIG. 1 represents the drawing of an impact sensor under the first embodiment of the present invention, of which (A) is a schematic sectional view and (B) is a schematic bottom plan view; FIG. 2 represents the drawing of another impact sensor under the first embodiment of the present invention, of which (A) is a schematic sectional view and (B) is a schematic bottom plan view; FIG. 3 represents the drawing of another impact sensor under the first embodiment of the present invention, of which (A) is a schematic sectional view and (B) is a schematic perspective view; FIG. 4 represents a schematic perspective view of a still other impact sensor under the first embodiment of the present invention; FIG. 5 represents the schematic sectional view for the tripping mechanism of an impact sensor under the first embodiment of the present invention.

Figure 6:
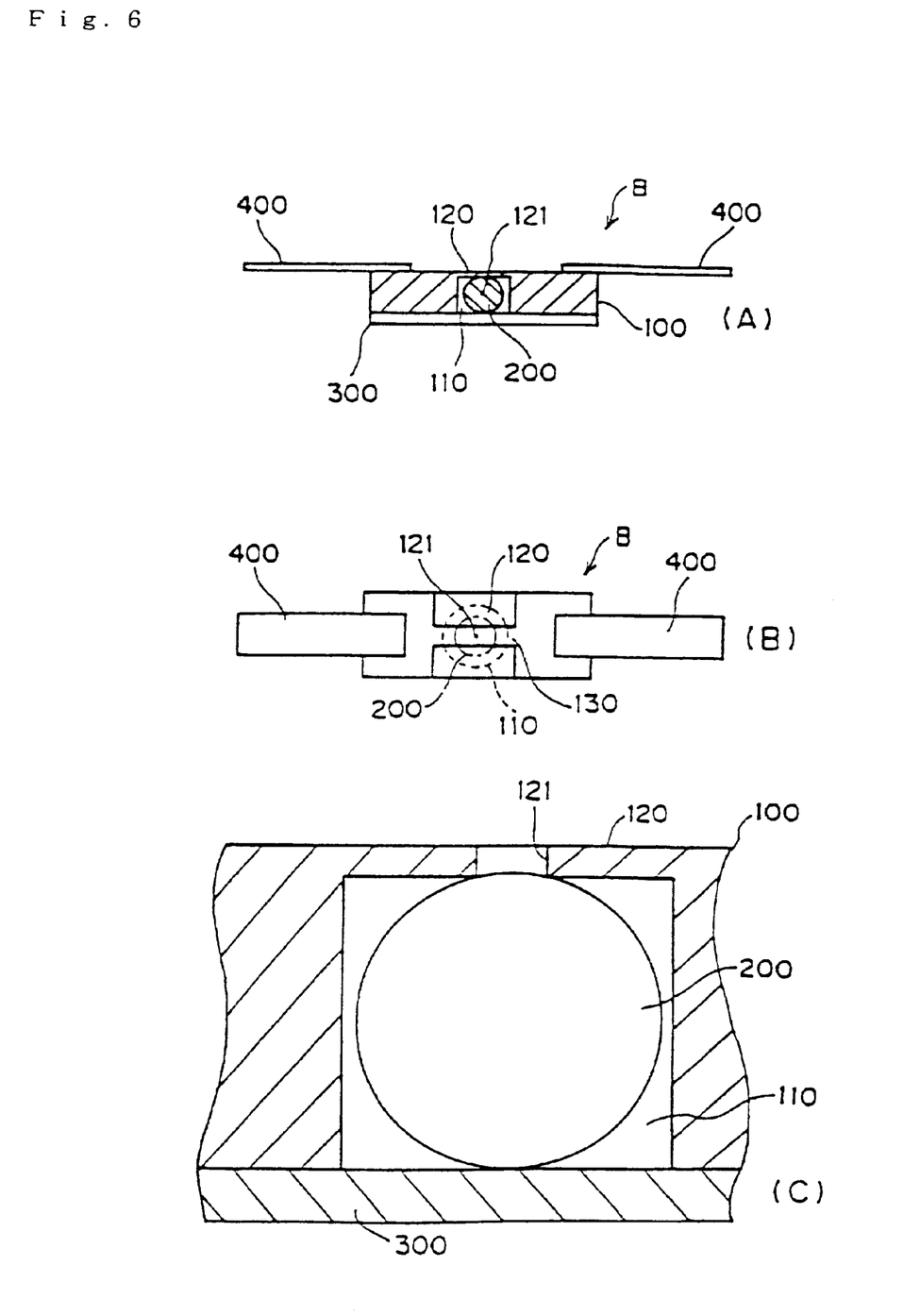
Figure 7:
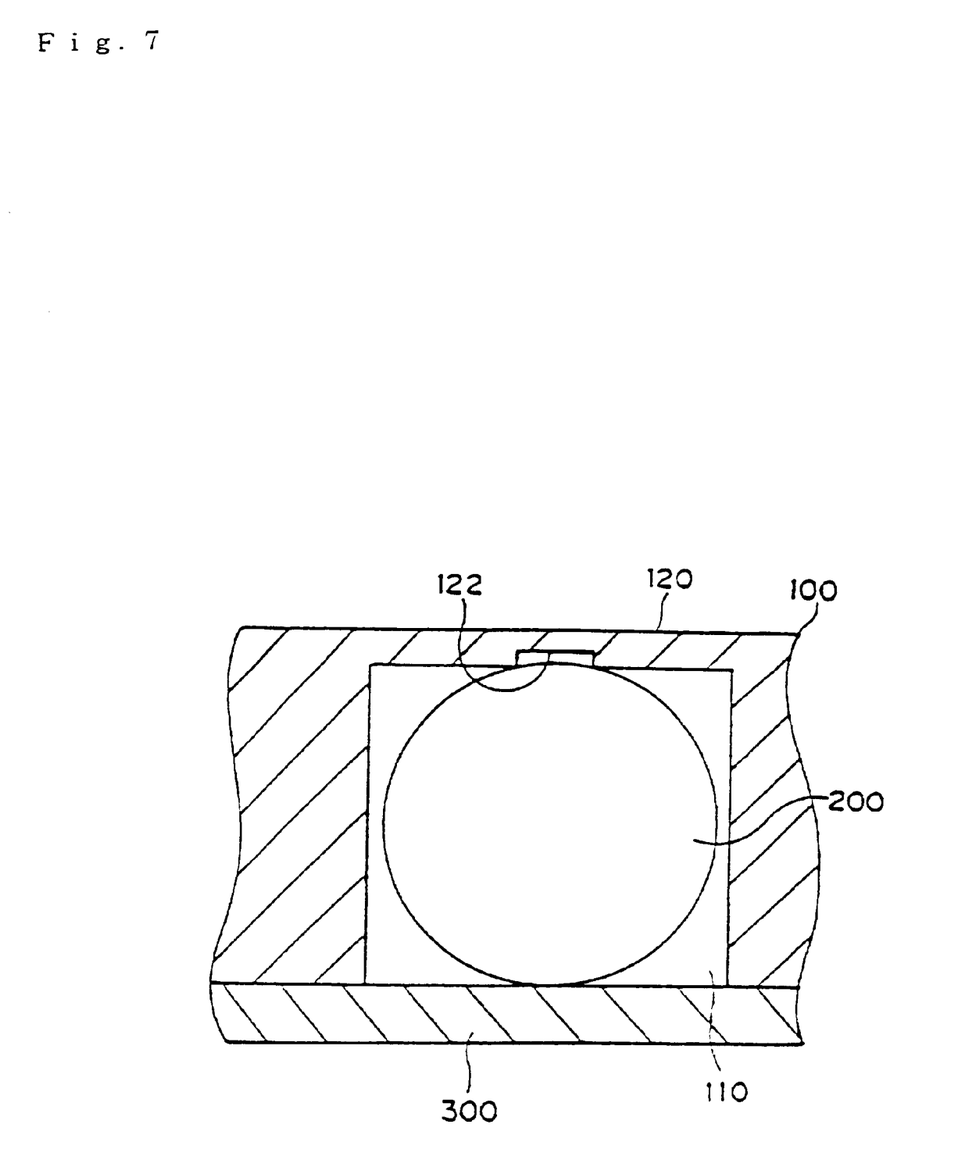
Figure 8:
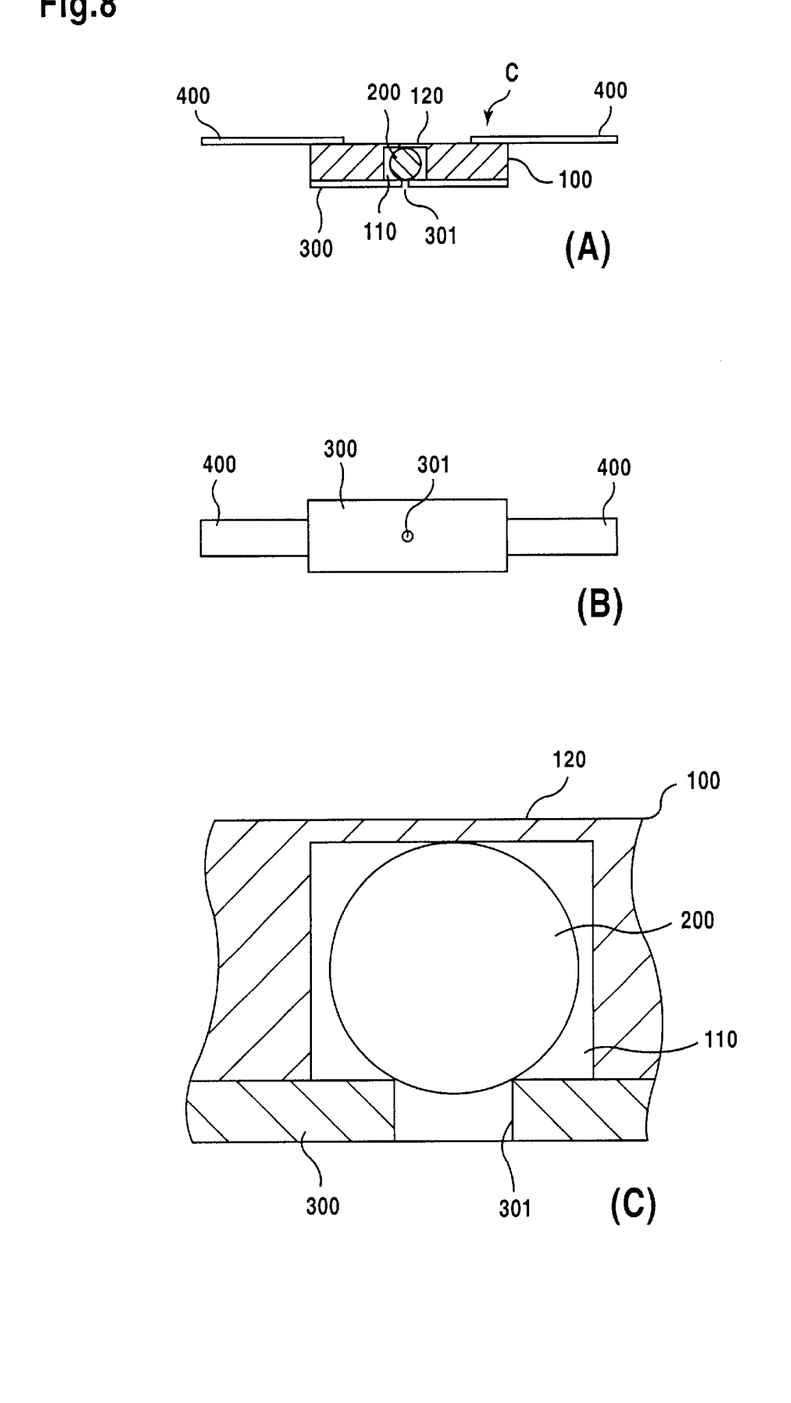
Figure 9:
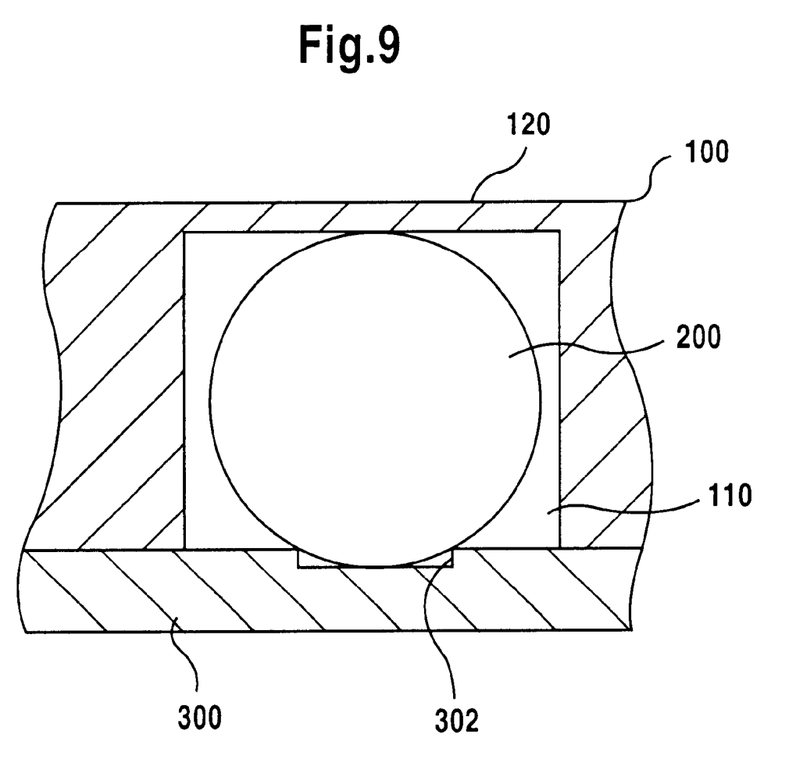

FIG. 6 represents the drawing of an impact sensor under the second embodiment of the present invention, of which (A) is a schematic sectional view, (B) is a schematic bottom plan view and (C) is a schematic drawing in detail of integral part; FIG. 7 represents a schematic drawing in detail of integral part of another impact sensor under the second embodiment of the present invention, FIG. 8 represents the drawing of an impact sensor under the third embodiment of the present invention, in which (A) is a schematic sectional view, (B) is a schematic bottom plan view and (C) is a schematic drawing in detail of integral part; and FIG. 9 is a schematic drawing in detail of integral part of another impact sensor under the third embodiment of the present invention.

Figure 10:
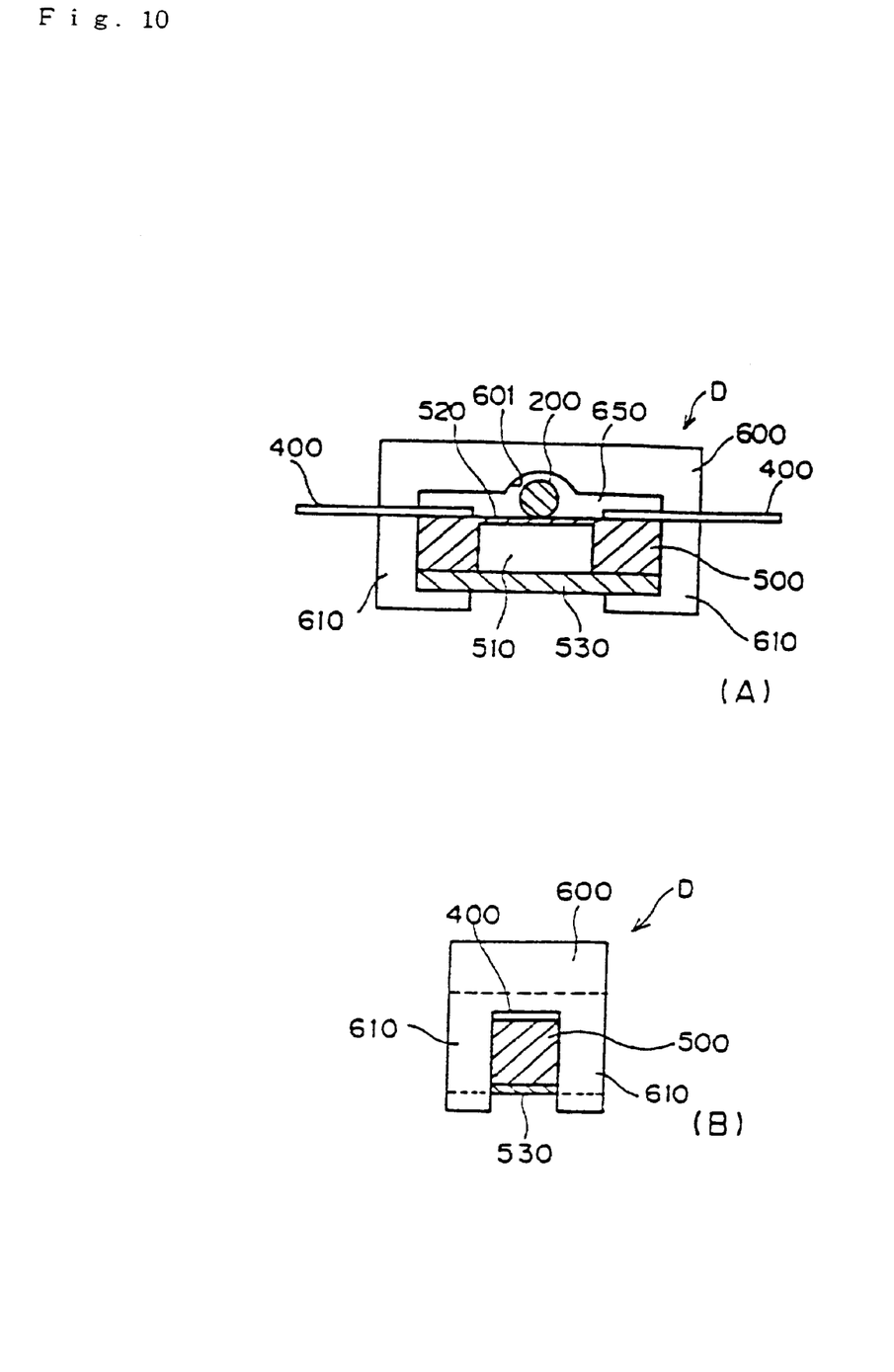
Figure 11:
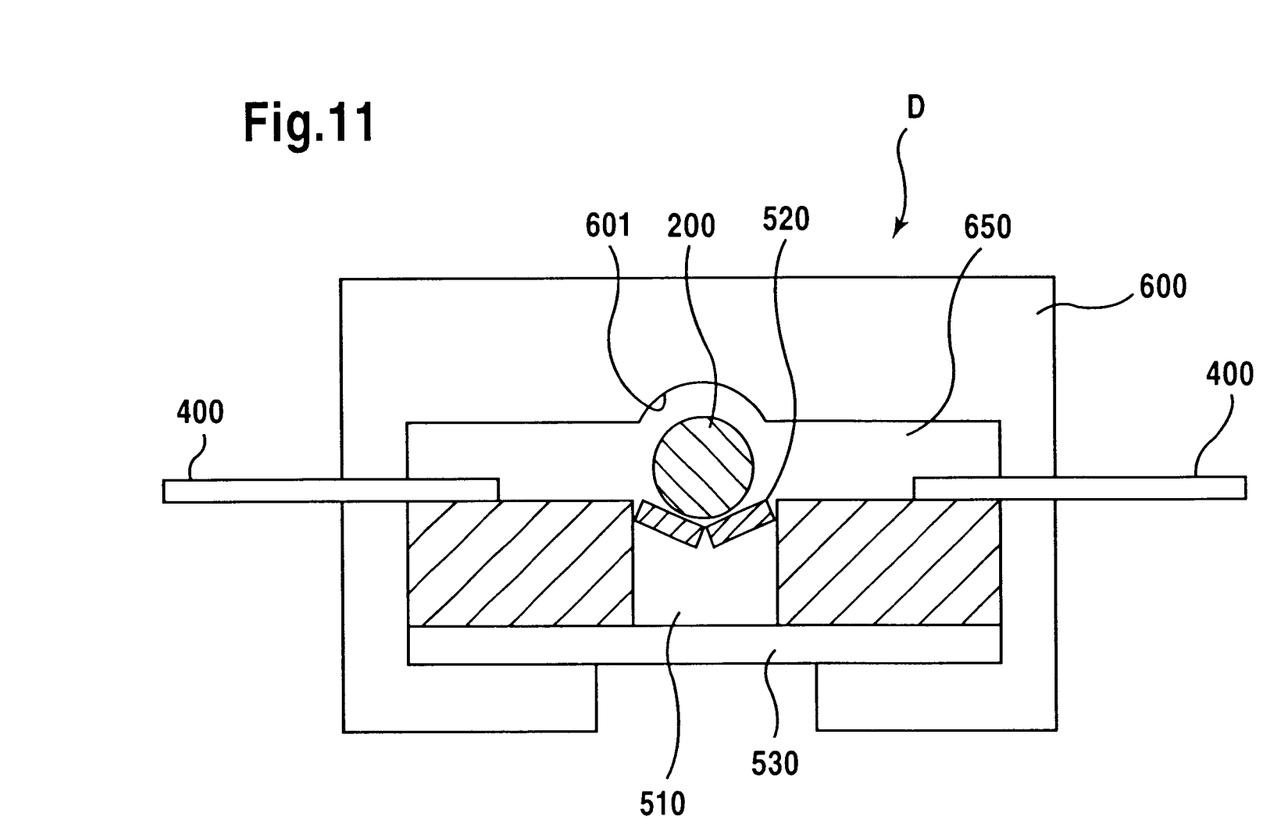
FIG. 11 schematic sectional view for tripping mechanism of an impact-pressure sensor under the fourth embodiment of this invention FIG. 12 schematic sectional view of another impact-pressure sensor under the fourth embodiment of this invention FIG. 13 drawing of an impact-pressure sensor under the fifth embodiment of this invention, which comprises.
Figure 12:
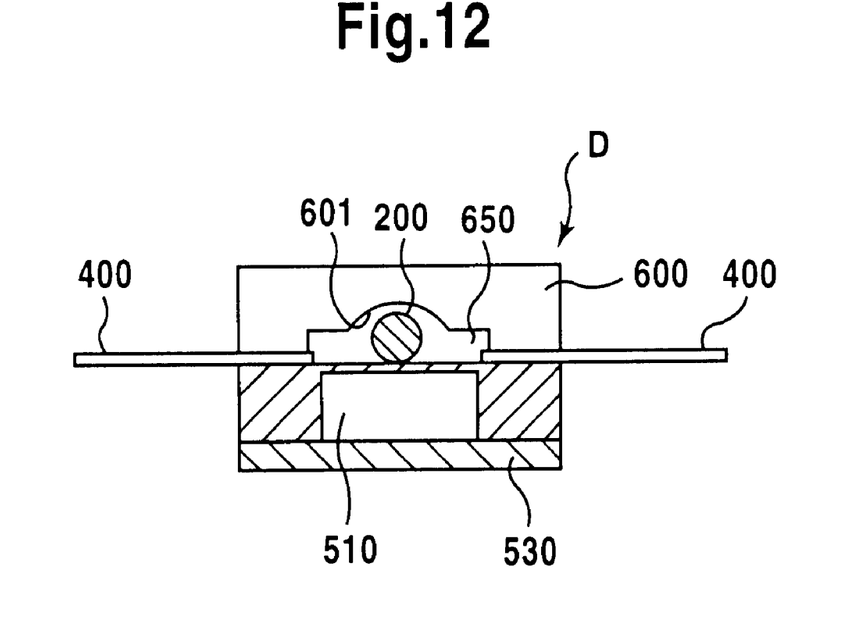
Figure 13:
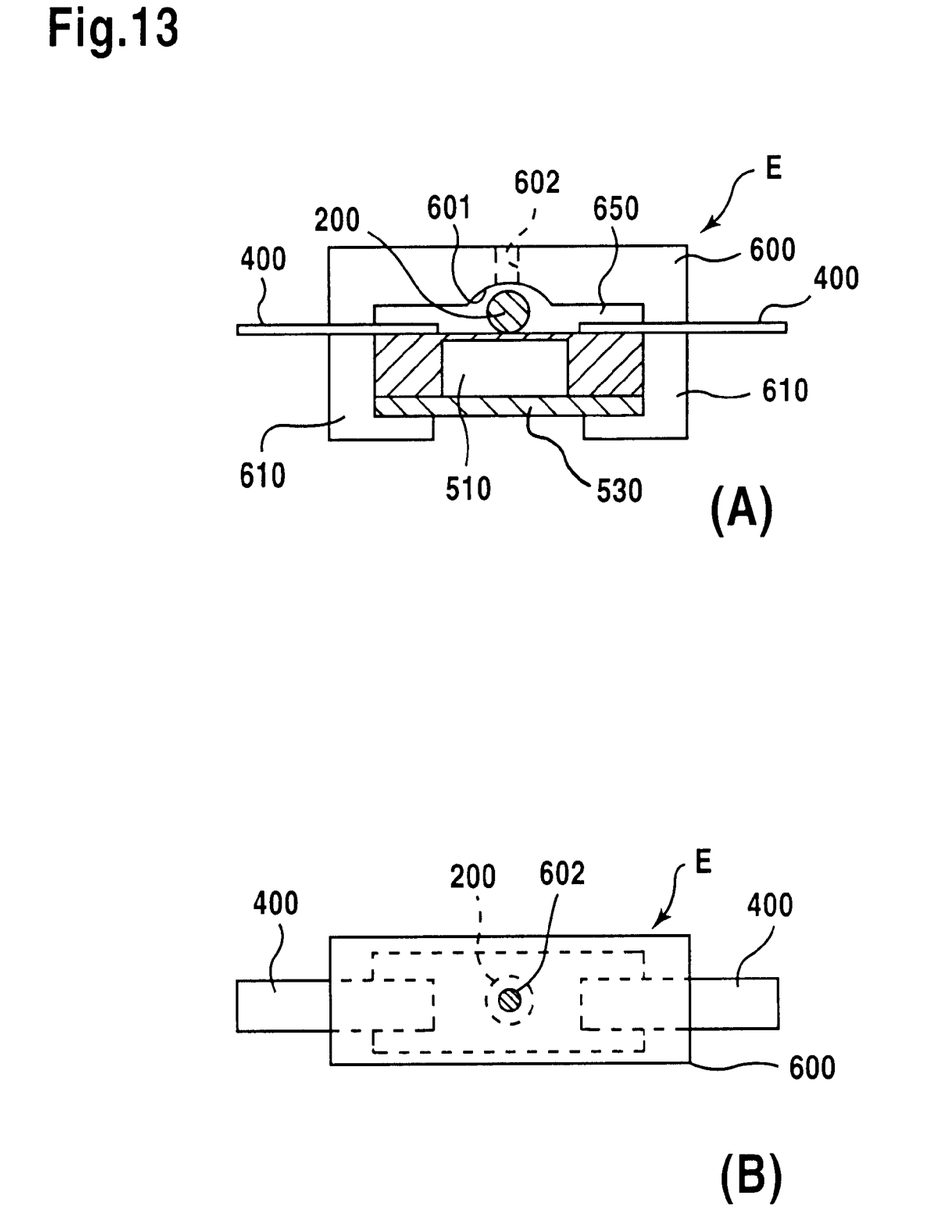

In addition FIG. 10 represents the drawing of an impact-pressure sensor under the fourth embodiment of the present invention, in which (A) is a schematic sectional view, (B) is a schematic side view; FIG. 11 represents the schematic sectional view for tripping mechanism of an impact-pressure sensor under the fourth embodiment of the present invention; FIG. 12 represents a schematic sectional view of another impact-pressure sensor under the fourth embodiment of the present invention; and FIG. 13 represents the drawing of an impact-pressure sensor under the fifth embodiment of the present invention, in which (A) is a schematic sectional view and (B) is a schematic plan view.

The impact sensor A under the first embodiment of the present invention comprises; main part 100 of sensor involving a cavity 110 therein, of which bottom part serves as a fracture part 120; impact force transfer member 130 connected to the fracture part 120; weight 200 being housed within the cavity 110; and seal member 300 to close the cavity 110, having the weight 200 confined therein. The weight 200 serves to break up the fracture part 120, whenever an impact force exceeding the predetermined level would have been encountered.

The main part 100 of the sensor confines the cavity 100 therein resulting in a box-type configuration. The bottom area of the cavity 110, i.e. the area opposite to the opening of the cavity 110 is designed thinner in its wall thickness when compared to other side surfaces (e.g. 0.1~0.3 mm), and such area serves as the fracture part 120. Dimension of the main part 100 of the sensor, e.g. made of ceramics, glass or plastics is determined depending on its use such as W3.5 (mm)×L8 (mm)×t4 (mm). The main part 100 of the sensor , when made of ceramics, is found featured with a high precision which will make it possible to produce a miniaturized impact sensor A with a higher reliability.

The cavity 110 is dimensioned to house the below mentioned weight 200 within it, e.g. the depth and the inside diameter of cavity is dimensioned to be slightly larger than the diameter of weight 200 and has a cylindrical configuration.

The fracture part 120 of the main part 100 of the sensor is equipped with the impact force transfer member 130 on its outside surface. The impact force transfer member 130 comprises electricity conductive metallic thin film made of copper, aluminium and others. In practice lamination, vacuum metallizing, spattering, printing, or other suitable procedures may be made in use when to be assembled. The film thickness of the impact force transfer member 130 is designed to be of such thickness that may be readily cut off simultaneously where the fracture part 120 will have been broken up. Further, this impact force transfer member 130 is attached across the fracture part 120 from right-hand towards left-hand end, as is shown in FIG. 1 (B). In addition, both side ends of the impact force transfer member 130 are made slightly wider than rest of it so as to be joined to a pair of terminals 400.

The weight 200 made of lead is of a configuration like a ball. The weight 200 serves to break up the fracture part 120, whenever the impact sensor A will have been exposed to an interference of impact force exceeding the predetermined level. Raw materials of larger specific weight and higher dielectric strength are considered suitable to be used for the weight 200. If the weight 200 were made of conducing material an accident such as short circuit could result, when the weight 200 upon breaking up the fracture part 120 would have run out of the cavity 110.

The main part 100 of the sensor is also equipped with the seal member 300 to close the opening of the cavity 110. The seal member 300 is so rigid that it would not destruct, even when the impact sensor A were subjected to an impact force exceeding the predetermined level. Provision of the seal member 300 at the main part 100 of the sensor may be made through adhesion, heat lamination and other procedures. Preparation of the impact sensor A will come to an end where the cavity 110 will be closed by the seal member 300 with the weight 200 left confined therein.

Where the impact sensor A so completed will have been subjected to an impact having its component force exceeding the predetermined level directed vertically to the fracture part 120, then the acceleration force of the weight 200 induced thereby will break up the fracture part 120 and the impact force transfer member 130 will be cut off at the same time. Accordingly the current flowing through the impact force transfer member 130 will be interrupted.

While the impact sensor A as aforesaid under the first embodiment is equipped with a pair of plate like terminals 400 being connected to the impact force transfer member 130, such terminals 400 may be dispensed with for the impact sensor A1, which to be surface mounted on the printed circuit board via the bump 410 as per FIG. 2. This advantage commonly applies for each of sensors discussed below.

In case of the above mentioned impact sensor A under the first embodiment only the bottom surface of the cavity 110 serves as the fracture part 120. In contrast, 2 surfaces, e.g. bottom- and side surfaces of the cavity 110 serve as the fracture part 120 in case of the impact sensor A2 as shown in FIG. 3. In this case the impact force transfer member 130 must be provided on each of the bottom and side-surfaces as shown in FIG. 3 (B).

In addition 3 surfaces, e.g. bottom-, side- and front surfaces of the cavity 110 serve as the fracture part 120 in the impact sensor A3 as shown in FIG. 4. In this case the impact force transfer members 130 must be provided on each of the bottom-, side- and front surfaces as per FIG. 4.

The impact sensor A does not function for an impact force acting in lateral direction to the fracture part 120, i.e. having no vertical component against the fracture part 120, whereas the impact sensor A2 is capable to function in such case, since it will react against an impact force having vertical component to either bottom or side surface of the fracture part 120.

Likewise the impact sensor A3 can react against an impact force having vertical component to either bottom-, side-, or front surface, since its front surface also serve as the fracture part 120.

Referring now to the impact sensor B under the second embodiment of the present invention, it comprises: main part 100 of sensor involving the cavity 110 therein, the bottom of which serves as the fracture part 120; impact force transfer member 130 provided it the fracture part 120; weight 200 housed in the cavity 110; and seal member 300 to close the cavity 110 having the weight 200 left confined therein, wherein the depth of cavity 110 is made less than the height of the weight 200, and hence the weight 200 protrudes by that extent outside the cavity 110 through an opening provided at the fracture part 120, so the weight 200 may be made adequately confined in the cavity 110, and serve to break up the fracture part 120 upon interference of an impact force exceeding the predetermined force.

The main part 100 of the sensor confines the cavity 110 therein resulting in a box-type configuration. The bottom area of the cavity 110, i.e. the area opposite to the opening of the cavity 110 is designed thinner in its wall thickness when compared to other side surfaces (e.g. 0.1~0.3 mm) and such area serves as the fracture part 120. Dimension of the main part 100 of the sensor made of ceramics, glass or plastics is determined depending on its use, such as W3.5 (mm)×L8 (mm)×t4 (mm). The main part 100 of the sensor, when made of ceramics, is found featured with a high precision which will make it possible to produce a miniaturized impact sensor A with a higher reliability.

Depth of the cavity 110 is made less than the height of the weight 200. Accordingly the weight 200 will protrude above the cavity 110 when the weight 200 has been simply put into the cavity 110. As the fracture part 120, however, is equipped with an opening 121, the weight 200 may be received by the cavity 110 such that a part of the weight 200 protrudes through the opening 121 as shown in FIG. 6 (C).

The cavity 110 has a depth that allows to receive the weight 200, such that a part of it may protrude out of the opening 121 provided and a diameter slightly larger than that of the weight 200. The cavity 110 is accordingly configured as a cylinder. The fracture part 120 of the main part 100 of the sensor is equipped with the impact force transfer member 130 on its outside surface. The impact force transfer member 130 comprises electricity conductive metallic film made of copper, aluminium or others. In practice lamination, vacuum metallizing, spattering, printing or other suitable procedures may be made in use, when to be assembled. The film thickness of the impact force transfer member 130 is designed to be of such thickness that may be readily cut off simultaneously where the fracture part 120 will have been broken up. The impact force transfer member 130 is provided across the fracture part 120, specifically across the space between left- and right hand end as shown in FIG. 6 (B). In addition both side ends of the impact force transfer member 130 are made slightly wider than rest of it so as to be joined to a pair of terminals 400.

The weight 200 made of lead is of a configuration like a ball. The weight 200 serves to break up the fracture part 120, whenever the impact sensor B will have been exposed to an interference of impact force exceeding the predetermined level. Raw materials of larger specific weight and higher dielectric strength are generally considered suitable to be used for the weight 200. If the weight 200 were made of conducting material an accident such as short circuit could result, when the weight 200 upon breaking up the fracture part 120 would have run out of the cavity 110.

The main part 100 of the sensor is also equipped with the seal member 300 to close the opening of the cavity 110. The seal member 300 is so rigid that it would not destruct, even when the impact sensor B were subjected to an impact force exceeding the predetermined level. Provision of the seal member 300 at the main part 100 of the sensor may be practiced through adhesion, heat lamination and other procedures. Preparation of the impact sensor B will come to an end where the cavity 110 will be closed by the seal member 300 with the weight 200 left confined therein.

Where the impact sensor B so completed will have been subjected to an impact having its component force exceeding the predetermined level directed vertically to the fracture part 120, then the acceleration force of the weight 200 induced thereby will break up the fracture part 120 and the impact force transfer member 130 will be cut off at the same time. Accordingly the current flowing through the impact force transfer member 130 will be interrupted.

As the impact sensor B is equipped with an opening 121 which makes it possible to fix the weight 200 in position, the weight 200 would not be displaced, if the impact sensor B were subjected to a jerk. Accordingly a more reliable functioning of the fracture part 120 is assured.

In an attempt to position the weight 200 under the second embodiment a recess 122 oriented inwardly is proven to exert the same effect as of the opening 121 as is shown in FIG. 7.

While in the impact sensor B under the second embodiment only the bottom surface of the cavity 110 serves as the fracture part 120, 2 surfaces, e.g. bottom- and side surfaces or 3 surface, e.g. bottom-, side- and front surfaces may also serve as the fracture parts 120, as have been the case for the impact sensor A2, A3 under the first embodiment.

Referring to FIG. 8 and 9 for the impact sensor C under the third embodiment, it comprises: main part 100 of sensor involving the cavity 110 therein, the bottom of which serves as the fracture part 120; impact force transfer member 130 provided at the fracture part 120; weight 200 housed in the cavity 110; and seal member 300 to close the cavity 110 having the weight 200 left confined therein. The weight 200 in this type of sensor may be made confined such that depth of the cavity 110 is made less than the height of the weight 200, so that the weight 200 protrudes by that extent outside the cavity 110 through the opening 301 provided at the fracture part 120. As the result the fracture part 120 is broken up by the weight 200 upon occurrence of interference by an impact force exceeding the predetermined level.

The impact sensor B and C differs from each other in that the opening 121 is provided at the fracture part 120 in case of impact sensor B, whereas the opening 301 is provided at the seal member 300 in case of impact sensor C.

While the intensity of the impact force becomes precisely adjustable, so that the fracture part 120 may be definitely broken up, when the opening 121 is provided at the fracture part 120, even a slight deviation in the size of opening 121 can cause variation in triggering intensity of the impact force. In contrast, where the opening 301 is provided in the seal member 300 the sensor becomes insensitive to the variation in the triggering intensity while at the same time performance of the positioned weight 200 remain unchanged.

As the main part 100 of the sensor and the weight 200 of the impact sensor A or B is also applicable for the impact sensor C, no detailed discussion for these parts will be made here. To fix the weight 200 in position an inward recess 302 instead of the opening 301 at the seal member 300 may be made in use. The inward recess will serve to receive a part of the weight 200 within it as shown in FIG. 9.

While in the impact sensor C under the third embodiment only the bottom surface serves as the fracture part 120, 2 surfaces, e.g. bottom- and side surfaces or 3 surface, e.g. bottom-, side- and front surfaces may serve as the fracture part 120 as has been the case in the impact sensor A2, A3 under the first embodiment.

Referring to FIGS. 10 to 12 for the impact-pressure sensor D under the fourth embodiment, it comprises as is shown in FIG. 10: main part 500 of the sensor having a hollow 510 isolated from outside and at least one surface of which serves as the fracture part 520; impact force transfer member provided at the fracture part 520 (not shown); seal member 600 which is secured to the main part 500 of the sensor and located at the predetermined position with a space 650 abutting on the fracture part 520; and a weight 200 being housed in the space 650. Within said seal member 600 is provided a passage that links up the space 650 with outside environment (not shown). Should an impact exceeding the predetermined level have occurred the fracture part 520 will be broken up by the weight 200. Should the difference between pressure inside the hollow 510 and the atmospheric pressure have exceeded the predetermined value fracture part 520 will also be broken up.

Of the hollow 510 isolated from outside within the main part 500 of the sensor one surface is made thinner in wall thickness than rest of it (e.g. 0.3~0.5 mm) and this surface serves as the fracture part 520. On the outer surface of the fracture part 520 is provided the impact force transfer member (not shown) The impact force transfer member consists of electricity conductive metallic thin film made of copper, aluminium, etc., which to be adhered on the fracture part 520. Also vacuum metallizing, spattering, printing or other suitable procedure may also be made in use for this purpose. The film thickness of this impact force transfer member is designed so thin that it becomes just cut off whenever the fracture part 520 will have been broken up. In addition the impact force transfer member is spanned from right- to left-hand end, with its both ends being made somewhat wider to facilitate the hooking up to a pair of terminal 400. The hollow 510 may be prepared in such a manner that the opening at the cavity on the main part 500 of the sensor is sealed off by a plate 530.

The seal member 600 is secured to the main part 500 of the sensor as if the main part 500 of the sensor were to be embraced by the seal member 600. The seal member 600 is equipped with the feet 610 protruding from 4 corners which serve as joining members where the seal member 600 is to be secured to the main part 500 of the sensor.

The seal member 600 is provided with the cavity 601 to confine the weight 200 within it so as to establish the predetermined space 650 in a position apart from the fracture part 520 when the seal member 600 is secured to the main part 500 of the sensor. The weight 200 so positioned in the recess 601 is automatically just above the fracture part 520.

The seal member 600 when secured does not come into contact with the main part 500 of the sensor, but allows a passage (not shown) to be interposed between both members, which serves to link up the space 650 with the outside environment. Accordingly the inside pressure of the space 650 and the atmospheric pressure will remain always in a same level.

Whenever the fracture part 520 of the impact-pressure sensor D has been subjected to an impact force having a vertical component acting thereto and exceeding the predetermined level the fracture part 520 will be broken up on account of acceleration force of the weight 200 as shown in FIG. 11, while at the same time the transfer member provided on the fracture part 520 will be cut off. Accordingly the current flowing through the impact force transfer member will be interrupted.

On the other hand where the inside pressure of the space 650 has been raised or lowered due to an increase or decrease of outside pressure resulting in a pressure difference between the hollow 510 and space 650 exceeding the predetermined value, the fracture part 520 will be broken up, at the same time the impact force transfer member provided at the fracture part 520 will be cut off. Accordingly the current flowing through the impact force transfer member will be interrupted.

In contrast to the assembling method of the impact-pressure sensor D, wherein the seal member 600 is secured to the main part 500 of the sensor in a manner as if the seal member 600 were embraced by the main part 500 of the sensor, an adhesive method may also be made in use as shown in FIG. 12, in which case the assembling work becomes simplified when compared with the mechanical one mentioned in the above.

Breaking up of the fracture part 520 and consequential interruption of the impact force transfer member on the fracture part 520 due to an impact or a pressure difference between inside of hollow 510 and outside exceeding the predetermined level is by no means affected by the difference seen among the assembling methods (mechanical- or adhesive method).

Referring to FIG. 13 for the impact-pressure sensor E under the fifth embodiment of the present invention, it is noted that the linking passage is embodied as a through-running hole 602 which runs through the seal member. It runs through the cavity 601 of the seal member 600. This does mean that the space 650 is linked up with outside environment via the through-running hole 602. With such a measure the outside pressure is assured to be definitely transferred to the space 650, even when the seal member 600 would have been assembled close to the main part 500 of the sensor.

As for other members such as weight 200, main part 500 of sensor, terminal 400, etc. the description for the impact-pressure sensor D is applicable also to those of sensor E and any discussion will be withheld here.

As has been the case for the impact-pressure sensor D, when the fracture part 520 of the impact-pressure sensor E has been subjected to an impact force having a vertical component acting thereto and exceeding the predetermined level the fracture part 520 will be broken up on account of accelerating force of the weight 200, while at the same time the impact force transfer member provided on the fracture part 520 will be cut off. Accordingly the current flowing through the impact force transfer member will be interrupted.

On the other hand where the inside pressure of the space 650 has been raised or lowered via through-running hole 602 depending on increase or decrease of outside pressure resulting in a pressure difference between the hollow 510 and the space 650 exceeding the predetermined value, the fracture part 520 will be broken up, at the same time the impact force transfer member provided at the fracture part 520 will be cut off. Accordingly the current flowing through the impact force transfer member will be interrupted.

While the impact force transfer member 130 for the impact sensors A, B, C and the impact-pressure sensor D, E may be composed through lamination of metallic thin film, vacuum metallizing, spattering, printing or other suitable procedures, it may be made of lower melting point materials such as tin, lead, etc., in which case the impact force transfer member 130 will attain a co-function of "temperature sensitive melting fuse".

The impact sensor under the present invention comprises: main part of sensor involving a cavity, of which at least one surface serves as a fracture part; impact force transfer member provided on the fracture part; weight confined in the cavity; and seal member to close the cavity with the weight left confined therein. An impact force exceeding the predetermined level will be apt to accelerate the weight to break up the fracture part.

In this type of impact sensor the weight is housed as a whole in the cavity, so that the dimension of the complete impact sensor is dependent on the dimension of the main part of the sensor. As the result the dimension of impact sensor as a whole may be reduced as intended.

In the impact sensor under the present invention the depth of the cavity is made less than the height of the weight, and an opening or recess is provided on the fracture part, through which a part of the weight may protrude. In such a manner the weight may be made confined within the cavity. Miniaturization not only of the main part of the sensor, but also of the entire sensor may also become feasible.

In the impact sensor under the present invention the depth of cavity is made less than the height of weight, and an opening or recess is provided on the seal member, through which a part of the weight may protrude above the surface. In such a manner the weight may be made confined within the cavity. Miniaturization not only of the main part of the sensor, but also of the entire sensor may also become feasible.

In the impact-pressure sensor under the present invention comprises: main part of the sensor having a hollow isolated from outside and at least one surface of it serves as the fracture part; impact force transfer member provided at the fracture part; seal member which is secured to the main part of the sensor and located at the predetermined position with a space in a location apart from the fracture part; and a weight being housed in the space. Within said seal member is provided a passage that links up the space with outside environment. Should an impact exceeding the predetermined level have occurred the fracture part will be broken up by the weight. Should the difference between pressure inside the hollow and the atmospheric pressure have exceeded the predetermined value, fracture part will also be broken up.

As the result a compact sensor of pressure sensitive type may also be feasible.

Where the passage is executed as a running through hole made through the seal member, the space is assured to be linked up with the atmosphere, resulting in a highly reliable pressure sensor.

Industrial Applicability

The present invention relates to an impact- and impact-pressure sensor applicable to a rechargeable battery, air bag in the automobile industry and the like.

What is claimed is:

1. An impact sensor comprising a main part having a cavity formed therein, a fracture part made up of at least one side surface of said cavity; an impact force transfer member provided at said cavity; a weight confined in said cavity; and a seal member closing the cavity with the weight confined therein, characterized in that said fracture part is apt to be broken up when an impact has been encountered.

2. An impact sensor specified in claim 1 characterized in that said cavity has a depth less than a height of said weight and the fracture part defines an opening or a recess, through which the weight protrudes so as to allow the weight to be confined within the cavity.

3. An impact sensor specified in claim 1 characterized in that the cavity has a depth less than the height of the weight and said impact sensor further comprises a seal member which defines an opening or a recess, through which the weight protrudes so as to allow the weight to be confined within the cavity.

4. An impact-pressure sensor comprising a main part defining a hollow which is isolated from the outside environment, a fracture part made up of at least one side surface of said hollow; an impact force transfer member provided at said fracture part; a seal member secured to said main part of the sensor; said main part having a predetermined space in a location apart from said fracture part, and a weight confined within said space, said seal member being equipped with a passage that links up said space and the outside environment, whereby the fracture part is apt to be broken up when an impact exceeding a predetermined level has been encountered or when a pressure difference between inside of said hollow and the outside environment has exceeded a predetermined value.

5. An impact-pressure sensor specified in claim 4 characterized in that said seal member defines, as said passage, a through running hole through the seal member.

6. An impact-pressure sensor specified in claim 4 characterized in that a depth of said space is made less than a height of the weight, and the seal member defines an opening or a recess, through which the weight protrudes so as to allow the weight to be confined within the cavity.

* * * * *